United States Patent [19]
Effenberger

[11] Patent Number: 5,930,018
[45] Date of Patent: Jul. 27, 1999

[54] METHOD AND APPARATUS FOR CONTROLLING COMMUNICATIONS IN A PASSIVE OPTICAL NETWORK

[75] Inventor: Frank J. Effenberger, Whitehouse Station, N.J.

[73] Assignee: Telcordia Technologies, Inc., Morristown, N.J.

[21] Appl. No.: 09/112,412

[22] Filed: Jul. 9, 1998

Related U.S. Application Data

[60] Provisional application No. 60/052,227, Jul. 11, 1997.

[51] Int. Cl.$^6$ ................................................ H04J 14/08
[52] U.S. Cl. ........................... 359/158; 359/137; 359/140; 370/252
[58] Field of Search ................................ 359/140, 158, 359/135, 137; 370/508, 519, 252

[56] References Cited

U.S. PATENT DOCUMENTS

| | | | |
|---|---|---|---|
| 4,827,474 | 5/1989 | Le Goffic et al. ................. | 370/104 |
| 5,327,277 | 7/1994 | Van Der Plas et al. ............ | 359/140 |
| 5,379,299 | 1/1995 | Schwartz ............................ | 370/108 |
| 5,745,484 | 4/1998 | Scott .................................. | 370/508 |

Primary Examiner—Leslie Pascal
Attorney, Agent, or Firm—Joseph Giordano; David A. Hey; Elizabeth A. Mark

[57] ABSTRACT

A method and system provide a unique communication and protocol between an optical line termination device and a plurality of optical network units sitting at different distances from the optical line termination device. The OLT determines the distance between it and each ONU and then requests communications from the ONUs in ascending order from nearest to farthest. The OLT also determines a time delayed period between the nearest ONU and the farthest ONU and awaits that time delay period before initiating subsequent ONU communication with the ONUs.

9 Claims, 3 Drawing Sheets

METHOD AND APPARATUS FOR CONTROLLING COMMUNICATIONS IN A PASSIVE OPTICAL NETWORK

CROSS-REFERENCE TO RELATED APPLICATIONS

This application claims the benefit of provisional application No. 60/052,227, filed on Jul. 11, 1997, the contents of which is hereby incorporated by reference.

1. Technical Field

The invention relates to contention allocation in a passive network, and more particularly to an ascending protocol for a passive optical network.

2. Background Art

Today, certain telecommunication service provides communicate with end devices via passive optical networks ("PONs"). For example, a cable company may communicate with multiple homes in a residential geographic community via such a network. PONs require optical line termination devices ("OLTs") to control communications with the end units, also referred to optical network units ("ONUs"). Because of the geographic network configuration, the distance of the optical communication path between the OLT and each ONU may be different, some ONUs being close to the OLT, others being farther away.

Delay times caused by these different transmission paths cause contention problems for communications between the OLT and its associated ONUs. Thus, the OLT devices must coordinate the communications between the OLT and the ONUs. Typically, the ONUs buffer information to be transported to the OLT and then transmit it to the OLT in response to a request to do so. Existing schemes for overcoming the contention problems require expensive intelligence at the ONUs to coordinate communications with the OLT. This expense can be prohibitive and certainly is not desirable.

DISCLOSURE OF THE INVENTION

Accordingly, an object of the invention is to overcome the disadvantages associated with prior optical passive network communication protocols.

Another object of the invention is to coordinate contention problems in an optical network without requiring access control intelligence in ONU devices.

To achieve these and other advantages and in accordance with the purposes of the invention, as embodied and broadly described, the invention includes a method of allocating communications between an optical line termination ("OLT") device and a plurality of optical network units ("ONUs") over a transmission path that includes a shared optical fiber. The method comprises the steps of determining the amount of time necessary to transmit information between said OLT and each ONU. In addition, the method also requests communications from each ONU in order from the nearest ONU to the farthest ONU. The method also determines the time difference between the time necessary to transmit information to the nearest ONU and the farthest ONU, and further includes the step of waiting that time difference before repeating the requesting step.

The invention also includes a method comprising the steps of an optical line termination ("OLT") apparatus connected to a plurality of optical network units ("ONUs") by a transmission path that includes a shared optical fiber, the method then comprises a means for determining the amount of time necessary to transmit information to each of said ONUs, as well as a means for requesting communications from each ONU in order from the nearest ONU to the farthest ONU.

It is to be understood that both the foregoing general description and the following detailed description are exemplary and explanatory and are not intended to provide further explanation of the invention as claimed.

BEST MODE FOR CARRYING OUT THE INVENTION

Figure 1:
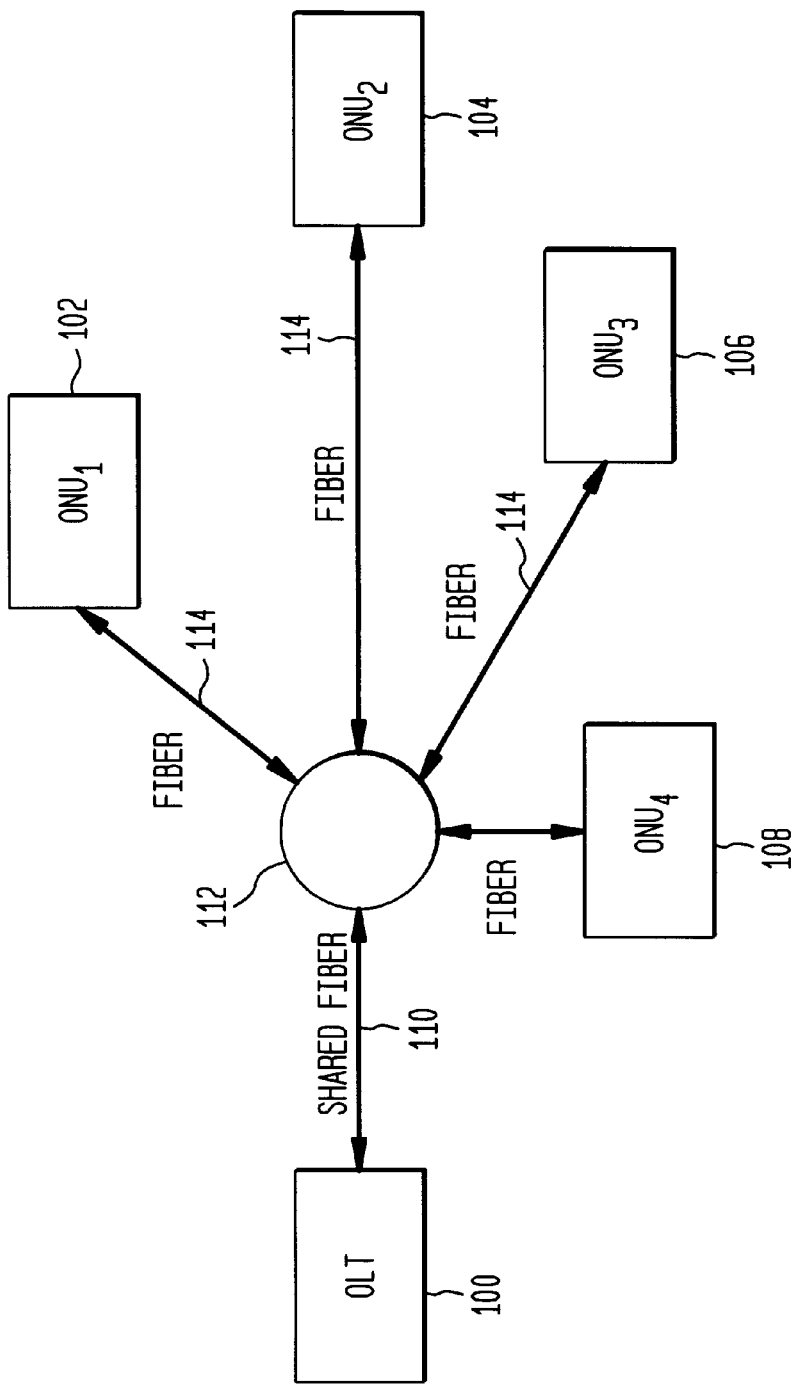
FIG. 1 is a block diagram of a passive optical network.

FIG. 1 shows a block diagram of a passive optical network. An optical line termination ("OLT") device 100 communicates with a plurality of optical network units ("ONU") 102–108 via two-way optical fiber transmission paths. The OLT transmits information along a shared fiber connection 110 to a passive optical splitter 112. Optical splitter 112 transmits the information from the OLT 100 along optical fiber links 114 to the various ONUs. Delay factors cause by the different lengths of fiber between the optical splitter 112 and each ONU 102–108 cause the communication problems described above.

Figure 2:
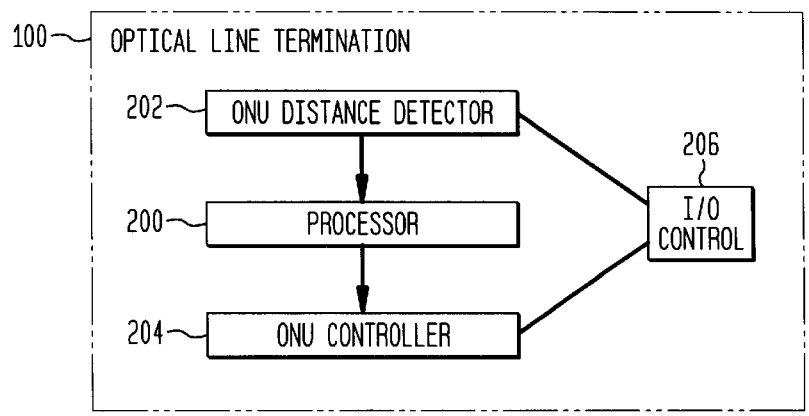
FIG. 2 is a block diagram of an optical line termination device in accordance with one embodiment of the present invention.

FIG. 2 shows an optical line termination device 100 in accordance with one embodiment of the present invention. OLT 100 includes a processor 200, an ONU distance detector 202, an ONU controller 204, and an IO controller 206. ONU distance detector 202 measures the distance from the OLT to each ONU. This may be done, for example, by transmitting a signal to an ONU and measuring the time necessary for the ONU to respond. ONU controller 204 performs additional functionality described herein necessary to affect the communication between the OLTs and the ONUs.

Figure 3:
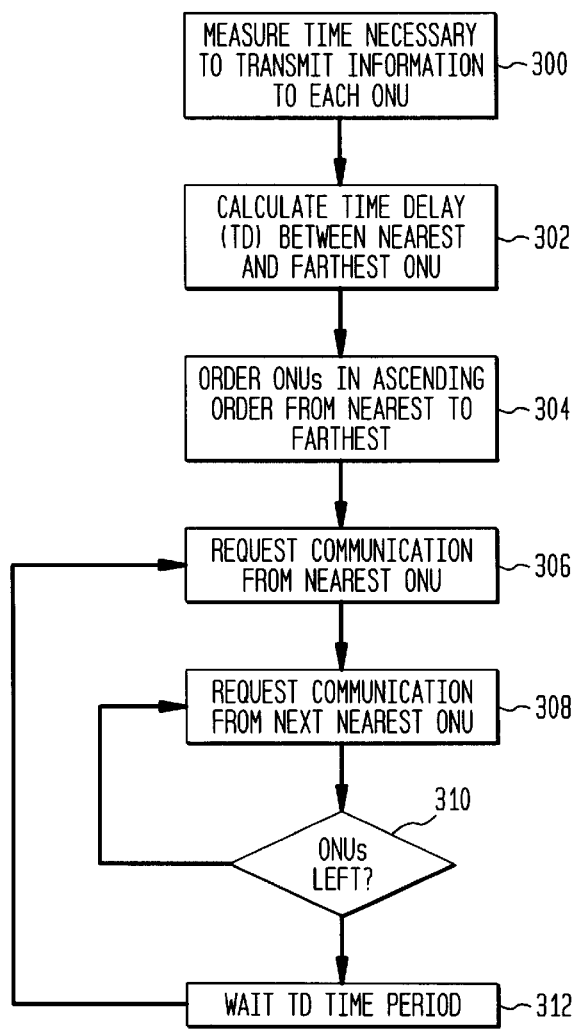
FIG. 3 is a processing flow diagram showing processing steps performed by an optical line termination device in accordance with one embodiment of the present invention.

FIG. 3 shows a processing flow diagram of the procedures performed by the OLT device 100 in accordance with one embodiment of the present invention. Initially, ONU distance detector 202 measures the time necessary to transmit information to each ONU (step 300). This measuring step tells the OLT which ONU is closest, which ONU is farthest away and the respective distances of the intermediate ONUs.

The ONU controller 204 then calculates the total time delay between the nearest and the farthest ONUs (step 302). This time delay period ("TD") will be described in more detail below. The ONU controller also lists the ONUs in ascending order from nearest to farthest (step 304). Having done so, the ONU controller 204 then requests communications from the nearest ONU first (step 306). Having done so, the ONU controller 204 requests communications from the next nearest ONU (step 308). The ONU controller then determines whether any additional ONUs exist (step 310). If other ONUs do exist, the ONU controller 204 requests communications from the next nearest ONU and repeats these steps. If no additional ONUs are identified in step 310, the ONU controller 204 waits the calculated TD period (step 312) and then repeats the communication request starting with the nearest ONU.

Figure 4A:
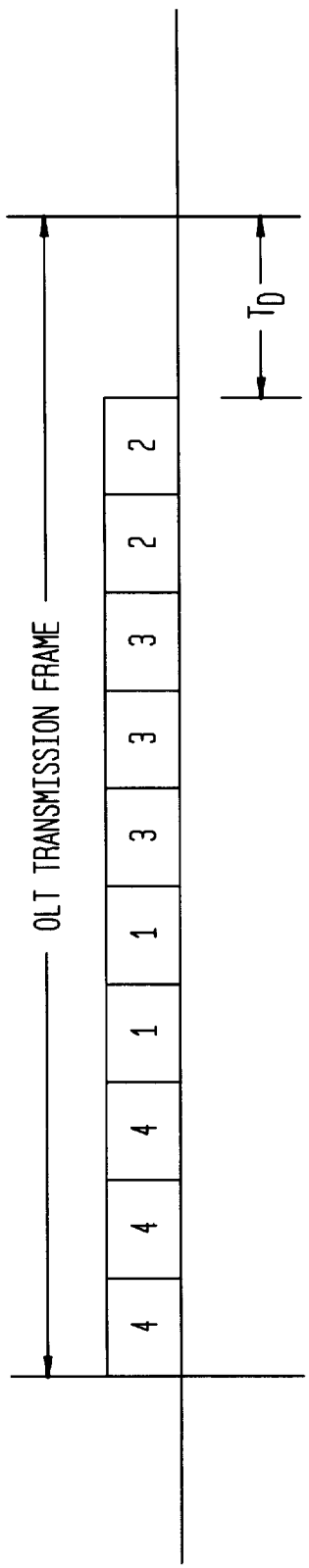
FIG. 4A is a diagram illustrating an OLT communication frame in accordance with one embodiment of the present invention.
Figure 4B:
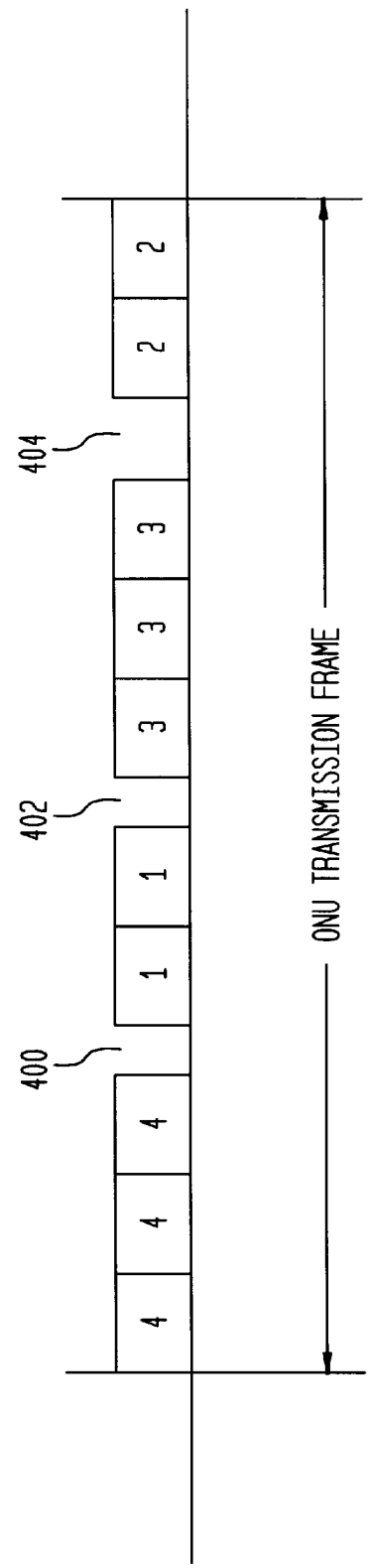
FIG. 4B is a diagram illustrating an ONU transmission frame in accordance with one embodiment of the present invention.

FIGS. 4A and 4B illustrate an OLT and ONU transmission frame, respectively, to help illustrate how the invention overcomes any contention problems. Referring briefly to FIG. 1, in ascending order from nearest to farthest, the ONUs are as follows: $ONU_4$ 108, $ONU_1$ 102, $ONU_3$ 106, and $ONU_2$ 104. Having made that determination, the OLT transmits the OLT transmission frame shown in FIG. 4A to request communications in that ascending order. Certain frame slots are allocated first to $ONU_4$ and then $ONU_1$, $ONU_3$, and $ONU_2$ in ascending order.

At shown at the end of the OLT frame, the OLT awaits the calculated time delay TD before beginning another OLT frame. By waiting this calculated time delay period TD the system ensures that there will be no contention problems between the ONUs trying to communicate with the OLT 100.

As shown in FIG. 4B, informationn is returned by the ONUs in the ascending order. The gaps 400, 402, and 404 represent transmission delay periods between the corresponding ONUs due to the physical distances from the OLT.

Thus, the invention recognizes that perfect timing is not necessary to relieve any contention problems. Rather, as long as the ONUs communicate with the OLT in ascending order of nearest to farthest and the OLT waits the predetermined time delay period TD before beginning a subsequent ONU communication frame, any resulting communication gaps do not affect the communication adversely.

The following specific examples help illustrate the invention. The first example concerns an application of the invention to a narrowband implementation. Narrowband services are typically distributed on a PON using a semi-permanent timeslot allocation, with each Digital Service Level Zero (DS-0) Terminal receiving its own timeslot. Each timeslot might contain 8 bits of information. Assuming that the network is sized so that each ONU has an average of 3 DS-0s, then the total network load is 48 DS-0s. Standard frame periods for synchronous communications, e.g., T1, E1, SONET, and SDH formats use 125 µs frames. If we divide up the 125 µs into 48 equal slots, each slot is only 2.6 µs long. The blind application of guard-time, as might be considered in conventional devices, will not work, because the required guard-time is longer than the timeslot. An alternative conventional solution called "time control ranging," involved putting controllable delay circuits into each ONU. By introducing appropriate delays, all the ONUs could be made to have the same round-trip delay to within a small error, and so the residual guard-time could be reduced to only a few ns. Again, this method has the drawback of requiring time delay control circuits at the ONU.

In accordance with the invention, assume, e.g., that the ONUs are of the simple type used in "blind guard-time" system, so that they transmit as soon as they receive their permission signal. If the timeslots are allocated so that the closest ONU goes first, followed by the next closet, and so on, then the signal received by the OLT will look like that shown in FIG. 4B. Since each ONU is always later than the one just preceding it, there cannot be any collision. In other words, the time error introduced by the distance mismatch is always positive, and thus only results in small gaps rather than collisions. The total dead-time for the frame is limited to the mismatch time, or in this example, 3 µs. Thus, the total efficiency for this scheme is over 98%. Note that if an ONU supports multiple lines, then it transmits for multiple consecutive timeslots.

To elaborate, we can define the timeslot duration to be 2.5 µs, thereby creating 50 equal slots. The upstream direction requires a minimum 3 µs of guard-time, and this can be accommodated by leaving the last two slots always spare. The downstream direction does not require the guard-time, and the two spare slots (equal to 16 bits) can be used for signaling and control. One scheme, for example, would be to define the 16 bits as follows:

| Bit assignment | Function |
| --- | --- |
| a0–a3 | Synchronization sequence |
| a4–a7 | ONU assignment number |
| b0–b5 | Beginning timeslot number |
| b6–b7 | Number of timeslots |

Using this definition, the OLT can command any individual ONU to access a number of slots (0–3) beginning at a particular time slot number (0–47). Since the sorting order of the ONUs should be maintained, the insertion of an additional timeslot into the sequence could be done by rippling up all the later timeslot allocations to make room. Therefore, the maximum delay in provisioning a new slot would be the number of ONUs times the frame time, or 2 ms. The ONUs could be constructed so that they would activate in the non-transmitting state. This keeps a just activated ONU from corrupting other ONUs. The OLT could then range an ONU by commanding it to use slot 47 (the last slot) while keeping slots 45 and 46 vacant. In this configuration, no interference is possible regardless of the new ONU's delay. As described above, when the ONU being ranged answers back, the ONU distance detector in the OLT determines the relative delay of the ONU. This data is stored in the OLT, and the ONU is then allocated a timeslot(s) in the main sequence.

The following example concerns an application of the invention to a broadband implementation. This general approach can be applied to a broadband services PON, such as that carrying ATM traffic (called an APON). In the APON, the data is transported in the form of packets composed of a basic ATM packet with a short PON management header attached. Typical speeds for the downstream path are 155.52 Mb/s or 622.08 Mb/s, and the upstream path runs at 155.52 Mb/s. The upstream path in this system has the same problem with access control, which can be accommodated using the present invention.

The ascending delay method can be used for ATM traffic. For simplicity, assume that the PON supports a symmetric 155.52 Mb/s line rate. Each ATM packet is 53 bytes long, and one byte is added for the APON header. Thus, each APON packet will be 54 bytes, or 432 bits long. This happens to produce a packet frequency of exactly 360 kHz, and this is an integer multiple of the DS-1 frame frequency of 8 kHz. Thus, exactly 45 packets, each being 2.78 µs will fit in a frame. Clearly, if the ONUs are commanded to send their packets in ascending delay order within this frame structure, then the same advantage derived for the narrowband service can be had. The only cost is that the last two packet slots, or 5.56 µs, must be left spare. This corresponds to a total time efficiency of 94%. If additional efficiency was desired, multiple frames could be tied together at the cost of longer potential latencies. The latency of the method as proposed would be on the order of the frame time. Since the frame time is only 125 µs, this should pose no problems for the transmission of voice, video, or data over the ATM link.

The SONET format has overhead and payload data fields. The overhead is specifically designed to monitor and control a point-to-point link. As such, it is unsuitable for the control on monitoring of a PON network. Therefore, carrying the SONET overhead on a PON is of no practical value. The SONET standard does specify the ATM payload rate to be about 96% of the total transmission rate. (i.e. 149.76 Mb/s payload rate over a 155.52 Mb/s rate link). In the downstream direction, the ascending delay arranging format presented here is 98% efficient, and thus meets this criterion. In the upstream direction, the scheme is only 94% efficient, but this could be increased to 96% by tying frames together in pairs. However, the upstream bandwidth has to be shared by multiple subscribers. Thus, even if the scheme was made to carry a full SONET ATM payload, the individual subscriber would never perceive it.

The control for the ONUs can be sent down in the headers of the downstream packets. When each downstream packet is received, each ONU would look at the header, and if the ONU's assignment number is presented, then the ONU would transmit a packet upstream. Because there are only 16 ONUs, this can be accomplished by using 4 bits out of the eight bits in the header. This leaves 4 bits for auxiliary signaling purposes.

The OLT would assign timeslots on the basis of demand, and would need to receive a status report from each ONU. This could be sent in the upstream APON header. Every time an ONU sends a packet, it would incorporate a status code that reflects the current incoming user data rate, the current buffer fill level, or both. The OLT would then take this information, and, in coordination with the subscriber's requested level of service, grant slots. It should be noted that the number of packets granted per frame does not need to be an integer (i.e. a low use subscriber might be granted one packet every other frame). One last requirement of this kind of signaling is that every ONU must be allowed to transmit at some minimum rate so that it can submit its status code. Thus, every ONU, even ones that do not support broadband services, must receive a small grant of, e.g., 1 packet every 16 frames. This would produce a potential latency of 2 ms maximum from the time an ONU needs service to when it could be granted time to transmit.

While there has been illustrated and described what are at present considered to be preferred embodiments and methods of the present invention, it will be understood by those skilled in the art that various changes and modifications may be made, and equivalents may be substituted for elements thereof without departing from the true scope of the invention.

In addition, many modifications may be made to adapt a particular element, technique or implementation to the teachings of the present invention without departing from the central scope of the invention. Therefore, it is intended that this invention not be limited to the particular embodiments and methods disclosed herein, but that the invention include all embodiments falling within the scope of the appended claims.

I claim:

1. A method of allocating communications between an optical line termination (OLT) and a plurality of optical network units (ONU) over a transmission path that includes a shared optical fiber, comprising the steps of:

determining the amount of time necessary to transmit information between said OLT and each ONU;

requesting communications from each ONU in order from the nearest to the farthest ONU; and determining the time difference between the time necessary to transmit information to the nearest ONU and the farthest ONU.

2. A method according to claim 1, further comprising the steps of:

waiting said time difference, then repeating said requesting step.

3. A method for controlling communication of information in time slots without contention between a central line termination apparatus and a plurality of network units over a shared transmission path without requiring intelligence at the network units specifically for this purpose, said method comprising the steps of at the central line termination apparatus determining the amount of time necessary to transmit information between the central line termination apparatus and each network unit;

requesting communication from each network unit in the order from the nearest network unit to the farthest network unit; and receiving information in time slots at the central line termination apparatus from the network units in ascending order of the time necessary.

4. The method of claim 3 wherein said central line termination apparatus is an optical line termination, said network units are optical network units, and said shared transmission path comprises a shared optical fiber.

5. The method of claim 4 wherein said optical network units are connected to said shared optical fiber in a star-configuration.

6. A passive timeslot communication network comprising a line termination apparatus, a plurality of network units, and means including a shared transmission path for connecting said network units with said line termination apparatus in a star-configuration;

said line termination apparatus including means for determining the amount of time necessary to transmit information to each of said network units and means for controlling the transmission of information from said network units in ascending order of the time necessary whereby contentions between said network units are avoided without the provision of specific intelligence for that purpose at said network units.

7. The network of claim 6 wherein said network is an optical network, said line termination apparatus is an optical line termination apparatus, said network units are optical network units, and said shared transmission path comprises a shared optical fiber.

8. The network in accordance with claim 7 wherein said means for connecting said optical network units with said line termination apparatus further includes an optical splitter.

9. A method for managing an optical network including an optical line termination apparatus and a plurality of optical network units connected in a star-configuration at different distances from the line termination apparatus so as to prevent contentions in the communication of information from the optical network units, said method comprising causing the line termination apparatus to perform the steps of:

determining the amount of time necessary to transmit information between the line termination apparatus and each of the optical network units;

listing the plurality of network units in ascending order from the nearest to the farthest; and;

transmitting the information from the optical network units to the line termination apparatus in the order of the listing from the nearest to the farthest unit.

* * * * *